United States Patent
Mallya et al.

(10) Patent No.: US 11,837,239 B2
(45) Date of Patent: Dec. 5, 2023

(54) SYSTEMS AND METHODS FOR SECURE AUTHENTICATION BASED ON MACHINE LEARNING TECHNIQUES

(71) Applicant: Verizon Patent and Licensing Inc., Basking Ridge, NJ (US)

(72) Inventors: Sumanth S. Mallya, Flower Mound, TX (US); Corbin Pierce Moline, Irving, TX (US); Saravanan Mallesan, Fairfax, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/934,273

(22) Filed: Sep. 22, 2022

(65) Prior Publication Data

US 2023/0009298 A1  Jan. 12, 2023

Related U.S. Application Data

(63) Continuation of application No. 15/930,044, filed on May 12, 2020, now Pat. No. 11,488,022.

(51) Int. Cl.
| | |
|---|---|
| *G10L 17/18* | (2013.01) |
| *G06N 3/088* | (2023.01) |
| *G10L 17/06* | (2013.01) |
| *G06F 21/32* | (2013.01) |
| *G06V 40/16* | (2022.01) |

(Continued)

(52) U.S. Cl.
CPC .............. *G10L 17/18* (2013.01); *G06F 21/32* (2013.01); *G06N 3/045* (2023.01); *G06N 3/088* (2013.01); *G06V 40/1347* (2022.01); *G06V 40/1365* (2022.01); *G06V 40/161* (2022.01); *G10L 17/06* (2013.01)

(58) Field of Classification Search
CPC ... G06V 40/1347; G06F 21/32; G06N 3/0454
See application file for complete search history.

(56) References Cited

U.S. PATENT DOCUMENTS

| | | | |
|---|---|---|---|
| 8,965,066 B1* | 2/2015 | Derakhshani | G06F 21/32 382/209 |
| 11,347,973 B2* | 5/2022 | Rhee | G06V 10/82 |

(Continued)

OTHER PUBLICATIONS

Qian, et al., "Data augmentation using generative adversarial networks for robust speech recognition", Speech Communication 114 (2019): 1-9. (Year: 2019).

*Primary Examiner* — Douglas Godbold

(57) ABSTRACT

A system described herein may provide a technique for the use of machine learning techniques to perform authentication, such as biometrics-based user authentication. For example, user biometric information (e.g., facial features, fingerprints, voice, etc.) of a user may be used to train a machine learning model, in addition to a noise vector. A representation of the biometric information (e.g., an image file including a picture of the user's face, an encoded file with vectors or other representation of the user's fingerprint, a sound file including the user's voice, etc.) may be iteratively transformed until the transformed biometric information matches the noise vector, and the machine learning model may be trained based on the set of transformations that ultimately yield the noise vector, when given the biometric information.

20 Claims, 12 Drawing Sheets

(51) Int. Cl.
*G06V 40/12* (2022.01)
*G06N 3/045* (2023.01)

(56) References Cited

U.S. PATENT DOCUMENTS

| | | | |
|---|---|---|---|
| 2013/0219193 A1* | 8/2013 | Baughman | G06F 21/6254 |
| | | | 713/193 |
| 2020/0036531 A1* | 1/2020 | Minovic | H04L 9/0637 |
| 2020/0053076 A1* | 2/2020 | Hassan | H04L 9/3231 |
| 2020/0252217 A1* | 8/2020 | Mathieu | H04L 9/3231 |
| 2021/0117733 A1* | 4/2021 | Mahto | G06F 18/24133 |
| 2021/0150006 A1* | 5/2021 | Novik | G06F 21/316 |

* cited by examiner

# SYSTEMS AND METHODS FOR SECURE AUTHENTICATION BASED ON MACHINE LEARNING TECHNIQUES

CROSS-REFERENCE TO RELATED APPLICATION

This Application is a Continuation of U.S. patent application Ser. No. 15/930,044, filed on May 12, 2020, titled "SYSTEMS AND METHODS FOR SECURE AUTHENTICATION BASED ON MACHINE LEARNING TECHNIQUES," the contents of which are herein incorporated by reference in their entirety.

BACKGROUND

Wireless user equipment ("UE"), such as mobile telephones or other wireless communication devices, may utilize various types of authentication mechanisms to authenticate a user. Such mechanisms may include a Personal Identification Number ("PIN") code, swipe pattern, biometrics (e.g., facial recognition or fingerprint recognition), and/or other mechanisms.

DETAILED DESCRIPTION OF THE PREFERRED EMBODIMENTS

The following detailed description refers to the accompanying drawings. The same reference numbers in different drawings may identify the same or similar elements.

Embodiments described herein provide for the use of machine learning techniques to perform authentication, such as the authentication of a user of a UE. For example, as described herein, user information (e.g., biometric information such as facial features, fingerprints, voice, etc. associated with a user) may be used to train a machine learning model, in addition to a noise vector. A representation of such user information (e.g., an image file including a picture of the user's face, an encoded file with vectors or other representation of the user's fingerprint, a sound file including the user's voice, and/or other types of suitable information) may be iteratively transformed until the transformed user information matches the noise vector, and the machine learning model may be trained based on the set of transformations that ultimately yield the noise vector, when given the user information.

A UE may perform the same set of transformations on user information provided in accordance with a subsequent authentication request, and may authenticate the user if the transformed user information matches the noise vector. For example, the user information may include user biometrics captured at the time of requested authentication, and the user may be authenticated based on the user biometrics if a transformed version of the user biometrics matches the noise vector. In this manner, the UE may be able to perform authentication of the user without storing the user information (e.g., the user's biometrics) itself. Further, the UE may be able to perform such authentication without needing a dedicated separate processor or other discrete hardware with the sole role of performing biometric authentication.

For the sake of explanation, FIGS. 1-6 describe embodiments in the context of image-based biometric information (e.g., a picture of a user's face). However, as discussed further below (e.g., with respect to FIG. 7), similar concepts may apply to other types of authentication information (e.g., other biometrics such as fingerprints, voice, and/or other types of authentication information).

Figure 1:
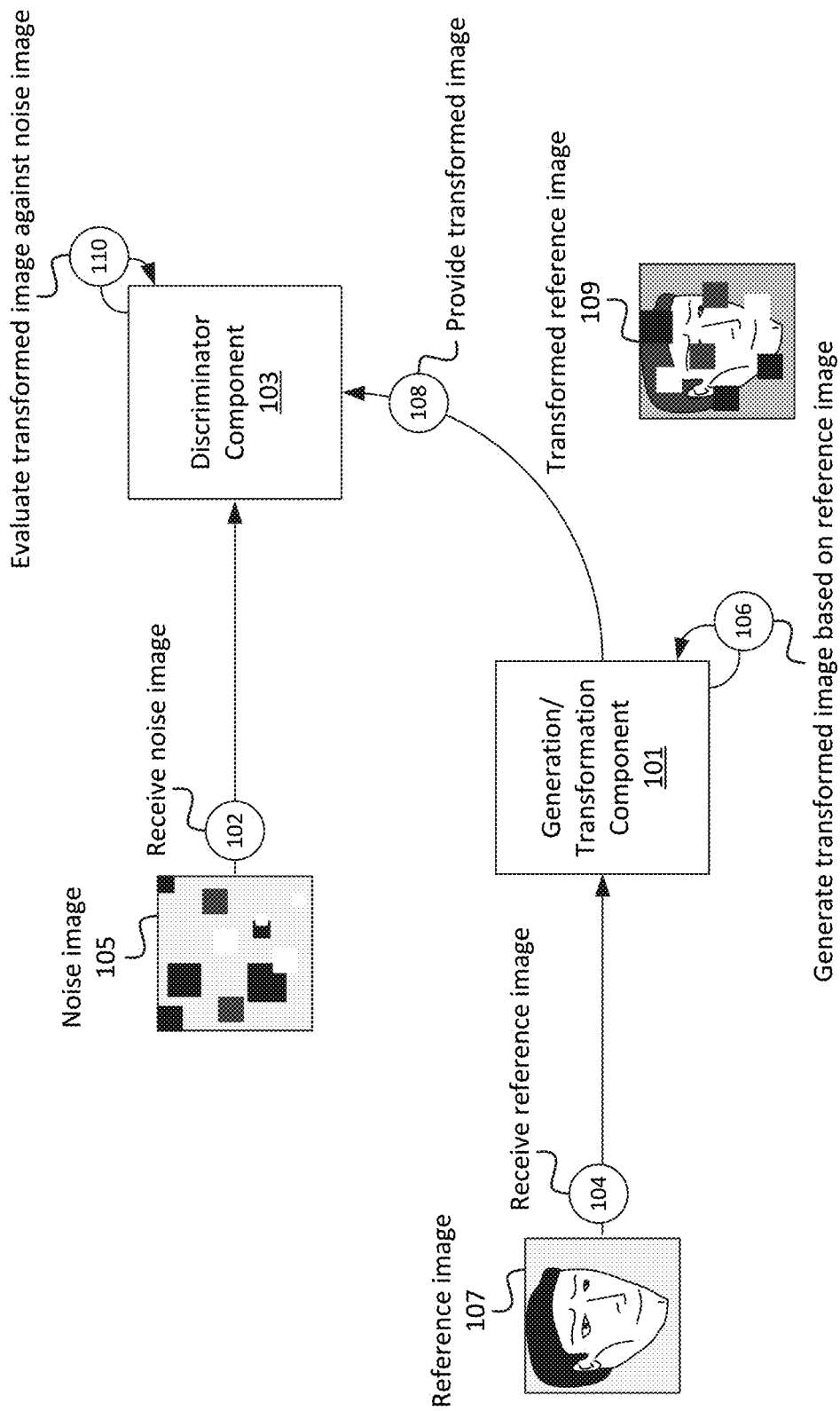
FIG. 1 illustrates an example configuration of a Generation/Transformation Component ("GTC") and Discriminator Component ("DC") in accordance with some embodiments, based on a reference image and a noise image.

As shown in FIG. 1, for example, some embodiments may include GTC 101 and DC 103. In some embodiments, GTC 101 and DC 103 may form, or may be part of, a Generative Adversarial Network ("GAN"). As discussed below, GTC 101 and/or DC 103 may be partially or entirely implemented by a particular UE (e.g., mobile phone, tablet, etc.) and/or some other device or system (e.g., a remote authentication system). In some embodiments, GTC 101 and DC 103 may be implemented by different devices or systems. For example, GTC 101 may be associated with a first service provider (e.g., a first discrete system or set of devices) while DC 103 may be associated with a second service provider (e.g., a second discrete system or set of devices). In this way, the overall security of the system may be enhanced, as no single entity holds all of the information that may be used in accordance with embodiments discussed herein. Further, in some embodiments, some or all of the information discussed herein may not be maintained at a user's UE. In this manner, malicious access to the information stored by the UE may be insufficient to gain access to the information used by GTC 101 and/or DC 103 to perform the secure authentication techniques described herein.

As shown, DC 103 may receive (at 102) noise image 105. Noise image 105 may be randomly generated, selected from a pool of images, and/or generated in some other manner. In this example, noise image 105 is shown as an image with a set of differently colored and shaped squares. In practice, noise image 105 may take any suitable form.

In some embodiments, a random image or noise generator, communicatively coupled to DC 103, may generate noise image 105. In some embodiments, DC 103 may generate noise image 105. As discussed above, while discussed in the context of an image, in some embodiments, DC 103 may receive an audio file, a text file, and/or some other type of information, which may generally be referred to as a "noise vector."

In some embodiments, different noise images 105 may be used for different iterations of the process shown in FIG. 1. For example, if the process shown in FIG. 1 pertains to a registration, setup, initialization, etc. of an authentication mechanism (e.g., a facial recognition authentication mechanism) for a particular user, a different noise image 105 may be generated and/or used for a different user registering, setting up, initializing, etc. the authentication mechanism at the same or a different device. In this manner, noise image 105 may be unique to each GAN and not feasibly able to be duplicated or reverse engineered.

As further shown, GTC 101 may receive (at 104) reference image 107. For example, GTC 101 may receive reference image 107 as part of an initial configuration, setup, and initialization process or the like. For example, reference image 107 may be captured by a camera of a UE (e.g., a mobile phone, tablet, etc.) associated with a particular user as part of a user-initiated authentication setup procedure. For example, the authentication setup procedure may be a procedure whereby an image of the user's face is captured and used as reference image 107.

As discussed below, images of the user's face (e.g., as captured during an authentication process) may be used to authenticate the user based on the techniques described herein. For example, as discussed below, GTC 101 may generate or modify a machine learning model based on reference image 107 and noise image 105, such that GTC 101 (e.g., in conjunction with DC 103) is able to securely identify images that match reference image 107, without needing to actually store reference image 107 on the UE or access reference image 107 itself. For example, GTC 101 may generate (at 106) transformed reference image 109, by applying one or more transformations to reference image 107. In this manner, transformed reference image 109 may be considered to be an encrypted version of reference image 107, where the set of transformations are used to create the encrypted version.

The transformations may, in some embodiments, be performed by performing image-related transformations. For example, GTC 101 may recognize reference image 107 as an image based on metadata or other information present in a file that contains or represents reference image 107. In some embodiments, GTC 101 may identify a particular type of encoding scheme associated with reference image 107, such as a Joint Photographic Experts Group ("JPEG") encoding scheme, a Graphics Interchange Format ("GIF") encoding scheme, and/or some other type of encoding scheme. GTC 101 may, based on identifying that reference image 107 is an image (and/or a particular type of image), manipulate, modify, transform, etc. reference image 107 by identifying features in reference image 107 and manipulating identified features of reference image 107 (e.g., modifying colors, moving lines, etc.).

In some embodiments, reference image 107 may perform transformations on a file or other data associated with reference image 107, without identifying that reference image 107 is an image (e.g., as opposed to some other type of data). For example, reference image 107 may manipulate, modify, transform, etc. data included in one or more files associated with reference image 107 without identifying what type of data (e.g., image data, in this example) is included in the one or more files. As discussed above, similar concepts may apply in instances where other types of data are used other than images, such as audio data, text data, or other types of data. That is, for example, in instances where instead of receiving image data, GTC 101 may receive audio data and may perform audio-related modifications to the audio data (e.g., modifying pitch, volume, or the like) and/or may perform modifications to one or more files that include or represent the audio data. The transformations, modifications, etc. performed by GTC 101 may be random, pseudorandom, selected from a pool of possible transformations, and/or determined in some other manner.

Returning to the example shown in FIG. 1, as a result of the transformation (at 106) of reference image 107, GTC 101 may generate transformed reference image 109. As shown in this example, transformed reference image 109 may have some similarities to and differences from reference image 107. For example, the same face depicted in reference image 107 may still be generally present in transformed reference image 109, but other features may also be present in transformed reference image 109 (e.g., shown as a set of squares overlaying the face). While transformed reference image 109 is represented in this manner for the sake of explanation, in practice, even a relatively minor modification to reference image 107 may cause transformed reference image 109 to be unrecognizable when displayed as an image.

GTC 101 may, after generating transformed reference image 109 based on reference image 107, provide (at 108) transformed reference image 109 to DC 103. DC 103 may evaluate (at 110) transformed reference image 109 against noise image 105 to determine a measure or degree of similarity between noise image 105 and transformed reference image 109. For example, DC 103 may utilize machine learning, deep learning, neural networks, pattern matching, and/or some other suitable technique for detecting similarities and/or differences between noise image 105 and transformed reference image 109. Additionally, or alternatively, DC 103 may determine similarities and/or differences between noise image 105 and transformed reference image 109 based on data included in one or more files associated with noise image 105 and transformed reference image 109. That is, for instance, DC 103 may determine differences in the associated underlying data of noise image 105 and transformed reference image 109 without decoding or analyzing the data itself to determine that noise image 105 and/or transformed reference image 109 include image data.

Based on the evaluating (at 110), and as discussed below, DC 103 may generate one or more scores to reflect the similarities and/or differences between noise image 105 and transformed reference image 109, a measure of similarity between noise image 105 and transformed reference image 109, a confidence level that noise image 105 and transformed reference image 109 depict the same image and/or include the same data, or the like. For the sake of brevity, such one or more scores are referred to herein as "a similarity score." In some embodiments, the similarity score may include a structural similarity ("SSIM") index, Peak Signal-to-Noise Ratio ("PSNR"), Mean Squared Error ("MSE"), and/or some other type of score, index, or the like.

As discussed herein, GTC 101 and DC 103 may perform an iterative process, in which GTC 101 continues to transform reference image 107 and DC 103 continues to determine similarity scores between transformed images generated by GTC 101, until the measure of similarity between noise image 105 and a transformed image generated by GTC 101 exceeds a threshold similarity (and/or until a minimum, maximum, or other pre-set quantity of iterations have been performed).

Figure 2:
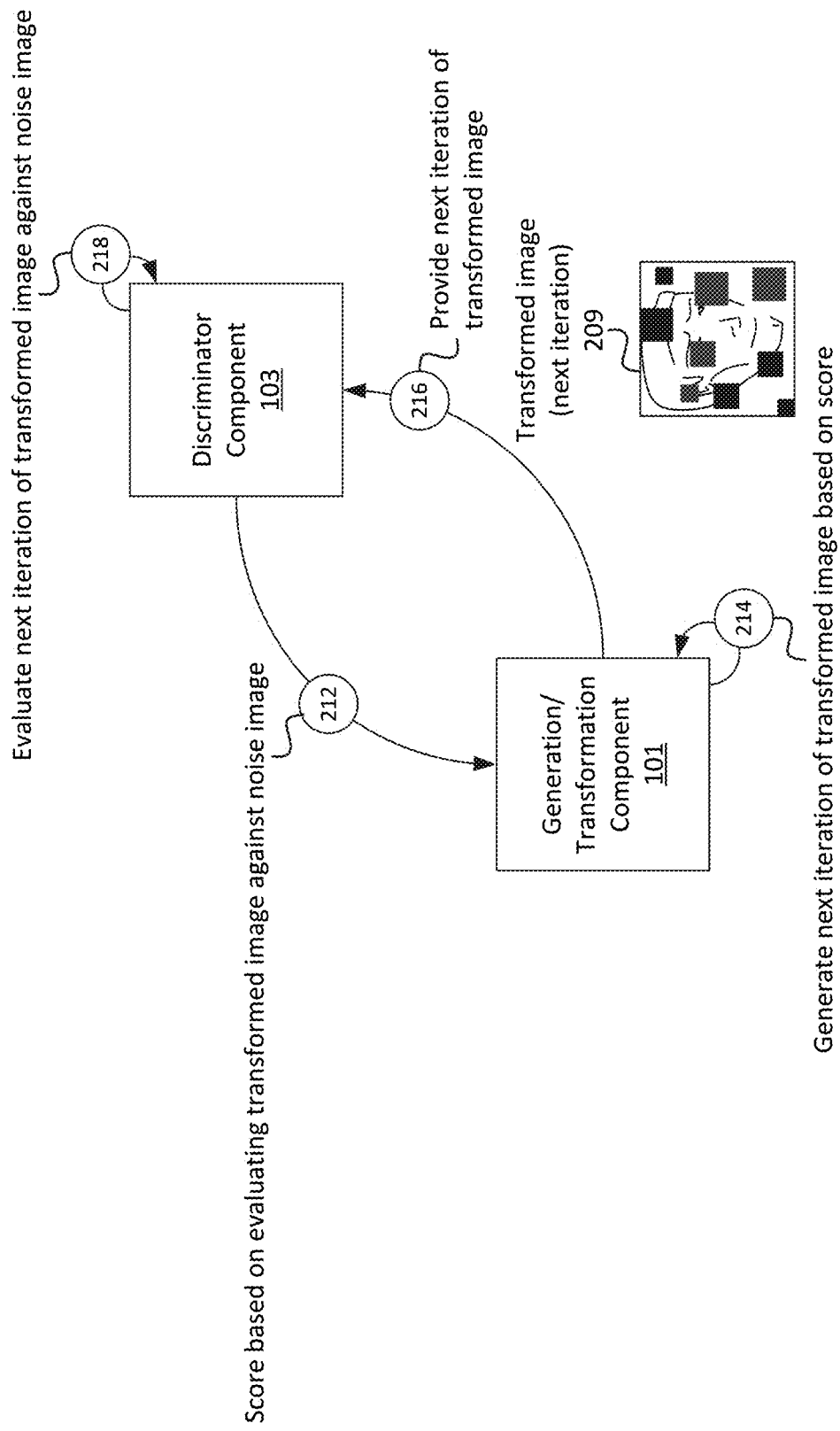
FIGS. 2 and 3 illustrate example iterations of a GTC utilizing machine learning techniques, in accordance with some embodiments, to determine a set of transformations to perform on the reference image to generate the noise image.

FIG. 2 illustrates one such iteration, and continues with the example shown in FIG. 1. As shown, DC 103 may provide (at 212) a score based on evaluating (e.g., at 110) noise image 105 against transformed reference image 109, which may be, or include, a similarity score as discussed above. GTC 101 may receive the similarity score and may generate (at 214) transformed reference image 209, which may be based on transformed reference image 109, reference image 107, and/or the received similarity score.

For example, GTC 101 may determine whether a previously made transformation caused transformed reference image 109 to be more similar or less similar to noise image 105 (e.g., as compared to reference image 107, and/or a previous iteration of transformed reference image 109). In instances where a previous transformation, at a previous iteration, caused transformed reference image 109 to become less similar to noise image 105 than a measure of similarity between reference image 107 and noise image 105 (or between a prior transformation of reference image 107 and noise image 105), GTC 101 may revert this transformation and/or may use a different type of transformation. On the other hand, in instances where a previous transformation caused transformed reference image 109 to become more similar to noise image 105, GTC 101 may retain this transformation when generating (at 214) a next iteration.

In some embodiments, iterations may be partially or entirely independent of other iterations. For example, if 500 iterations are performed, 500 independent transformations may be performed with 500 different associated similarity scores.

As further shown, GTC 101 may provide (at 216) transformed reference image 209 to DC 103, which may evaluate (at 218) transformed reference image 209 against noise image 105. For example, as similarly described above (e.g., at 110), DC 103 may generate one or more similarity scores, indicating a measure of similarity between transformed reference image 209 and noise image 105. As discussed below with respect to FIG. 3, the operations shown in FIG. 2 may be repeated until the similarity score exceeds a threshold similarity score. Additionally, or alternatively, the operations shown in FIG. 2 may be repeated until a threshold quantity of iterations have been performed (e.g., 100 iterations, 1,000 iterations, 1,000,000 iterations, or some other quantity of iterations).

Figure 3:
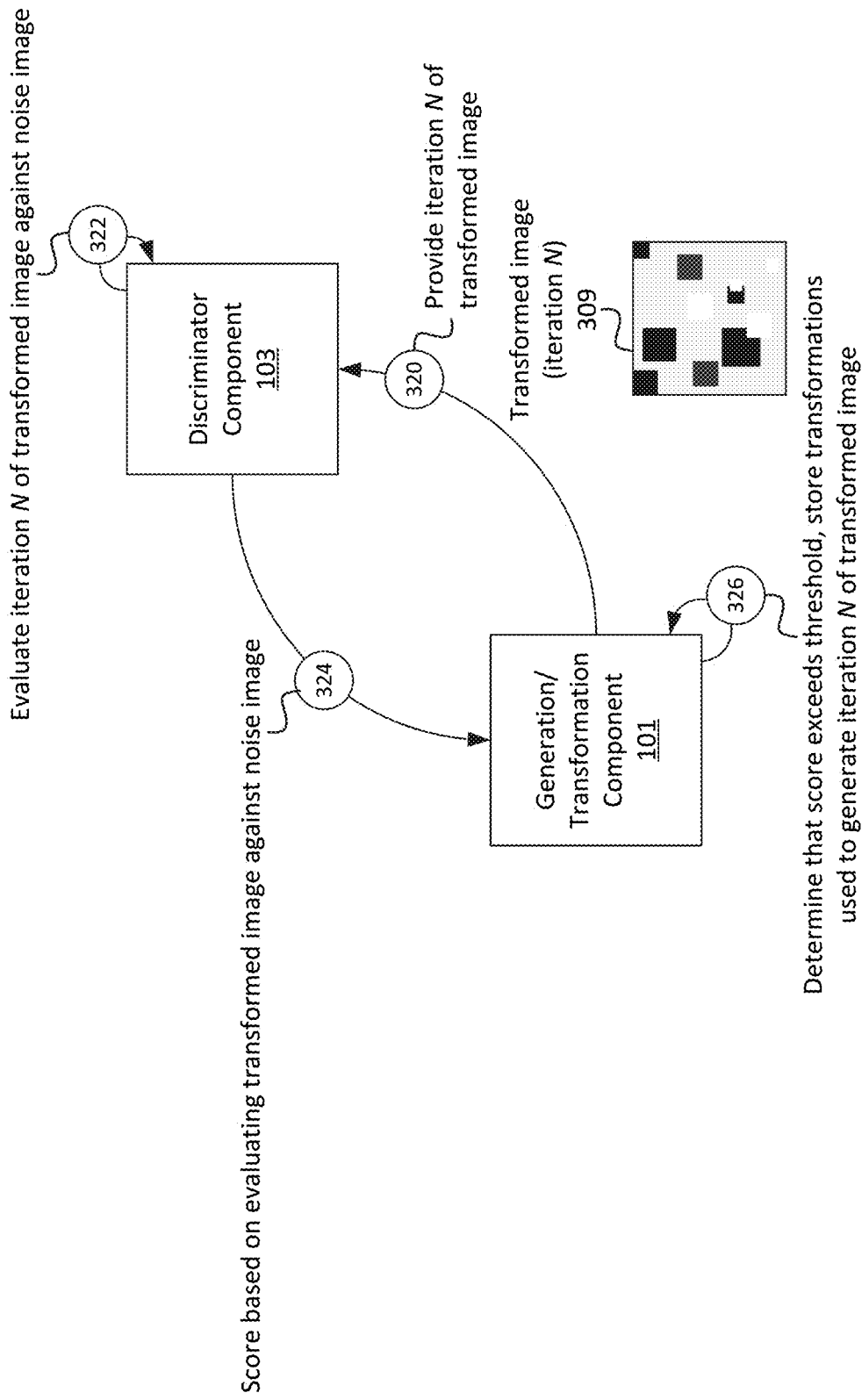

For example, as shown in FIG. 3, GTC 101 may provide (at 320) transformed reference image 309, generated at a given iteration N, to DC 103. DC 103 may evaluate (at 322) transformed reference image 309 against noise image 105, and may provide (at 324) a corresponding similarity score to GTC 101. In this instance, GTC 101 may determine (at 326) that the received similarity score exceeds a threshold similarity score (e.g., at least 0.98 on a scale of 0.0-1.0, or some other value and/or on some other scale). Additionally, or alternatively, GTC 101 may determine that at least a minimum quantity of iterations have been performed (e.g., that N is greater than the minimum), and/or that a maximum quantity of iterations have been performed (e.g., that N is equal to the maximum).

GTC 101 may also store information indicating what transformations were performed on reference image 107 to generate transformed reference image 309 (e.g., a cumulative set of transformations performed over the N iterations). In some embodiments, GTC 101 may also store the score provided by DC 103. That is, GTC 101 may store information indicating a particular set of transformations, and a score associated with the transformations. As discussed below, GTC 101 may apply the transformations to a test image, or other type of suitable data, and determine whether a score, provided by DC 103 based on the transformed test image, matches the stored score associated with the transformations. In some embodiments, a match may be determined when the score is exactly the same, while in some embodiments the match may be determined when the score is within a threshold range of the stored score, such as within 5%, within 10%, or some other range. In some embodiments, DC 103 may store the score in addition to, or in lieu of, GTC 101. In such embodiments, DC 103 may provide a binary indicator, such as "match" or "no match," to GTC 101 when GTC 101 provides a transformed image to DC 103 for evaluation.

Figure 4:
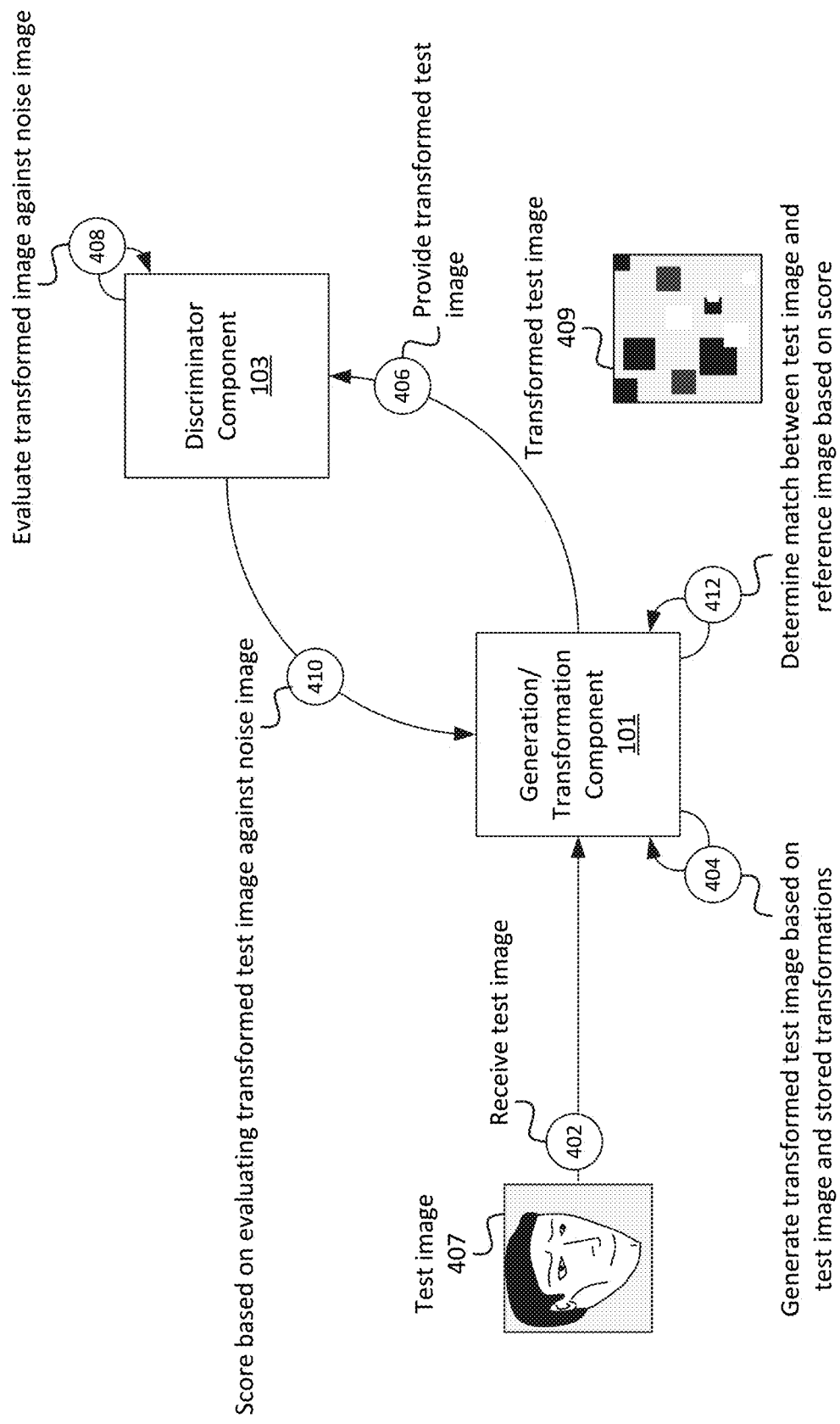
FIG. 4 illustrates an example of the GTC and DC utilizing a set of transformations, determined utilizing machine learning techniques, to modify a test image and verify that the transformed test image matches a previously configured reference image, in accordance with some embodiments.

For example, as shown in FIG. 4, GTC 101 may receive (at 402) test image 407. Test image 407 may be received as part of an authentication process at a UE, such as a facial recognition-based authentication process. For example, test image 407 may be captured by a front-facing camera of the UE when a facial recognition-based authentication process is initiated at the UE, such as when a user picks up the UE and faces the UE towards his or her face.

GTC 101 may generate (at 404) transformed test image 409 by applying the stored transformations (e.g., stored at 326) to test image 407. As similarly discussed above, transformed test image 409 may be represented in FIG. 4 as an image depicting differently colored and sized blocks, but in practice may take some other form. GTC 101 may provide (at 406) transformed test image 409 to DC 103, which may evaluate (at 408) transformed test image 409 against the previously stored (at 102) noise image 105.

When evaluating (at 408) transformed test image 409, DC 103 may use the same or similar techniques as used when evaluating (at 110, 218, 322, etc.) transformed images 109, 209, and/or 309. For example, DC 103 may use image recognition techniques, machine learning, deep learning, neural networks, pattern matching, and/or other suitable techniques to compare transformed test image 409 to noise image 105. As discussed above, DC 103 may generate one or more scores reflecting a level of similarity or difference between transformed test image 409 and noise image 105, a confidence level that transformed test image 409 and noise image 105 depict the same subject (e.g., the same face), and/or some other suitable indicator of a measure of similarity or confidence between transformed test image 409 and noise image 105. As discussed above, DC 103 may generate a binary indicator of whether transformed test image 409 and noise image 105 should be considered as a match.

DC 103 may provide (at 410) the score or indicator, based on evaluating transformed test image 409 against noise image 105, to GTC 101. GTC 101 may determine (at 412) whether test image 407 is a match with reference image 107 based on the received score or indicator. For example, GTC 101 may determine whether a face depicted in test image 407 is the same face as depicted in reference image 107 based on the indicator. In other types of analyses, GTC 101 may determine whether some other subject depicted in test image 407 (e.g., a fingerprint) is the same as another instance of the same type of subject (e.g., another fingerprint) depicted in reference image 107. For example, GTC 101 may determine (at 412) whether a score (received at 410) is the same as, or is within a threshold range of, a previously stored (e.g., at 326) score. As another example, GTC 101 may determine (at 412) a match when receiving (at 410) a binary indicator from DC 103, indicating that test image 407 and reference image 107 match. On the other hand, GTC 101 may determine (at 412) that test image 407 and reference image 107 do not match when the score (received at 410) does not match the previously stored score, when the score is not within a threshold range of the previously stored score, and/or when DC 103 provides an indicator indicating that test image 407 and reference image 107 do not match.

Figure 5:
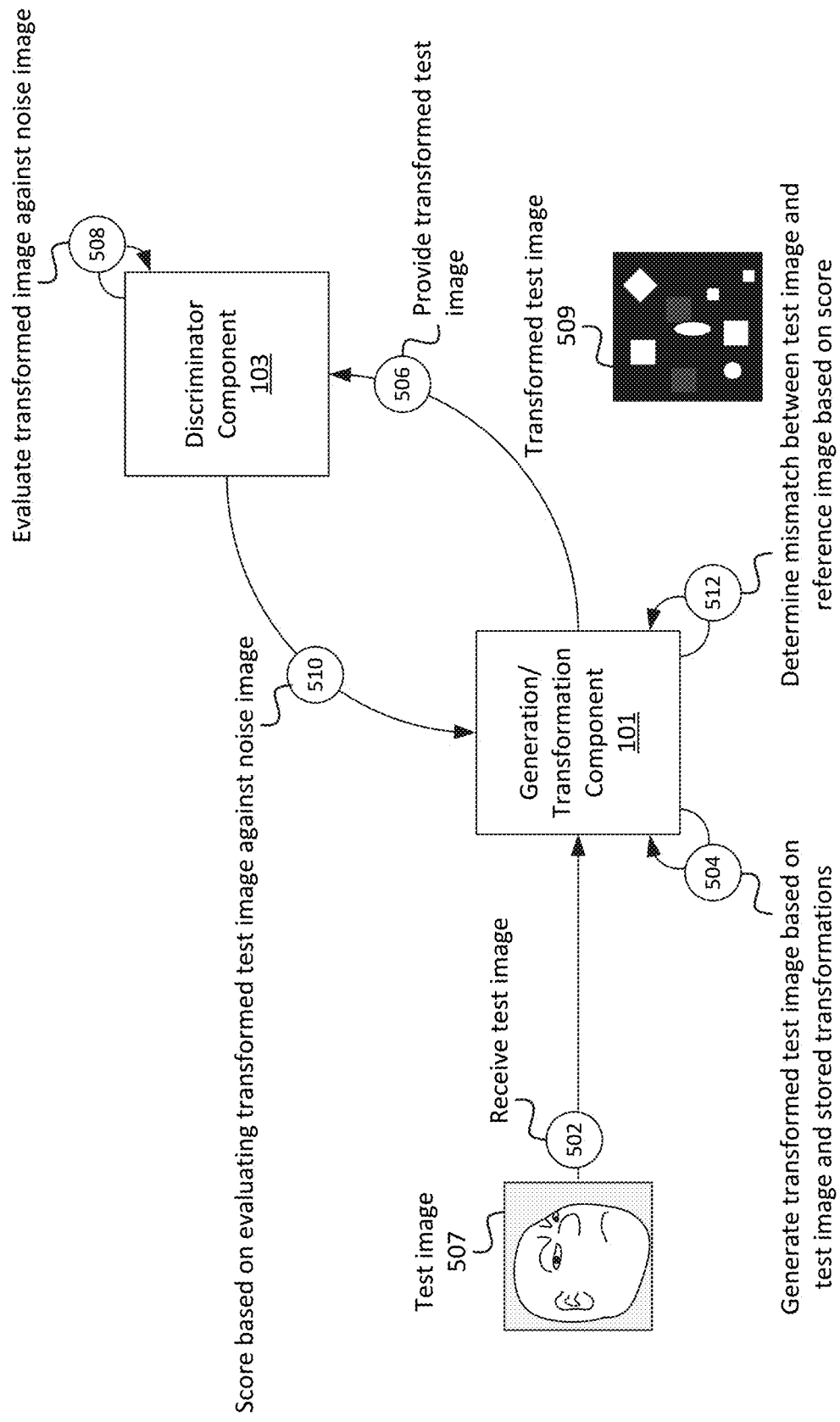
FIG. 5 illustrates an example of the GTC and DC utilizing a set of transformations, determined utilizing machine learning techniques, to modify a test image and verify that the transformed test image does not match a previously configured reference image, in accordance with some embodiments.

For example, as shown in FIG. 5, GTC 101 may receive (at 502) test image 507, and generate transformed test image 509 based on test image 507 and the stored set of transformations. As depicted in FIG. 5, transformed test image 509 is distinctively different from noise image 105. This difference between transformed test image 509 and noise image 105 may be a result of the difference between reference image 107 and test image 507. GTC 101 may further provide (at 506) transformed test image 509 to DC 103. DC 103 may evaluate (at 508) transformed test image 509 against noise image 105, and provide (at 510) a score or indicator to GTC 101, based on evaluating transformed test image 509 against noise image 105. In this instance, GTC 101 may determine (at 512) a mismatch between test image 507 and reference image 107.

Figure 6:
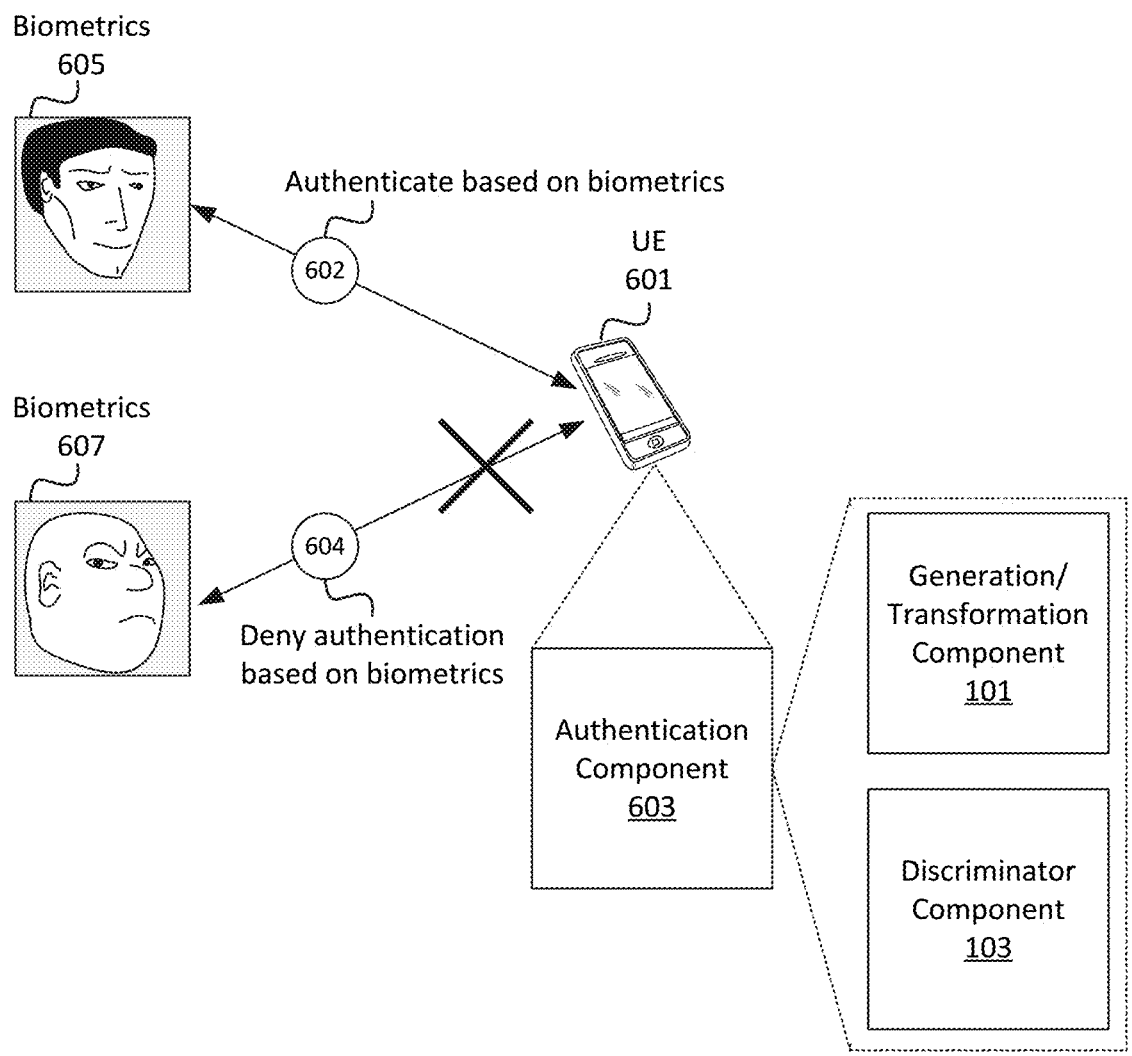
FIGS. 6 and 7 illustrates an example of a UE utilizing machine learning techniques described herein to authenticate a user using biometric information.

As noted above, the techniques described above may be used by a UE to authenticate a user attempting to gain access to, or "unlock," the UE. For example, as shown in FIG. 6, UE 601 may be a mobile device that includes authentication component 603. For example, authentication component 603 may include, or may be communicatively coupled to, one or more biometrics capture components, such as a camera, fingerprint scanner, a microphone, and/or some other type of hardware component that is able to capture or receive biometric information for a user attempting to perform an authentication procedure via UE 601, such as a user attempting to unlock UE 601. Authentication component 603 may determine, based on received biometrics, whether to authenticate the user or deny authentication of the user. In accordance with some embodiments, authentication component 603 may include, and/or may be communicatively coupled to, GTC 101 and/or DC 103. For the purposes of this example, assume that GTC 101 and DC 103 have been previously configured based on a reference image and a test image (e.g., as similarly described above with respect to FIGS. 1-3).

In this example, UE 601 may authenticate (at 602) a first user based on first biometrics 605, and may deny (at 604) authentication of a second user based on second biometrics 607. In this example, biometrics 605 may include an image of the first user, captured via a front-facing camera associated with UE 601 (e.g., a front-facing camera included in, or communicatively coupled to, authentication component 603), and biometrics 607 may include an image of the second user. Further, in this example, authentication component 603 (e.g., GTC 101 and/or DC 103) may have been configured based on a reference image of the first user (and not the second user). For example, as discussed above, authentication component 603 may provide biometrics 605 to GTC 101, which may transform biometrics 605 based on a stored set of transformations, provide a transformed version of biometrics 605 to DC 103, and DC 103 may compare the transformed version of biometrics 605 to a previously stored noise image. For the first user, GTC 101 and/or DC 103 may determine that the transformed version of biometrics 605 matches the stored noise image, while for the second user, GTC 101 and/or DC 103 may determine that the transformed version of biometrics 607 does not match the stored noise image. As discussed above, GTC 101 and/or DC 103 may be implemented by devices or systems that are remote from UE 601. For example, a service provider may offer authentication services for UE 601, and biometrics 605 and 607 may be provided via one or more networks to one or more devices or systems associated with the service provider, which implement GTC 101 and DC 103. In some embodiments, as also discussed above, different service providers may implement GTC 101 and DC 103. In such embodiments, UE 601 may communicate with a device or system that implements GTC 101, DC 103, and/or a gateway or portal (not shown) that serves as a front-end interface for authentication services implemented by GTC 101 and/or DC 103.

Figure 7:
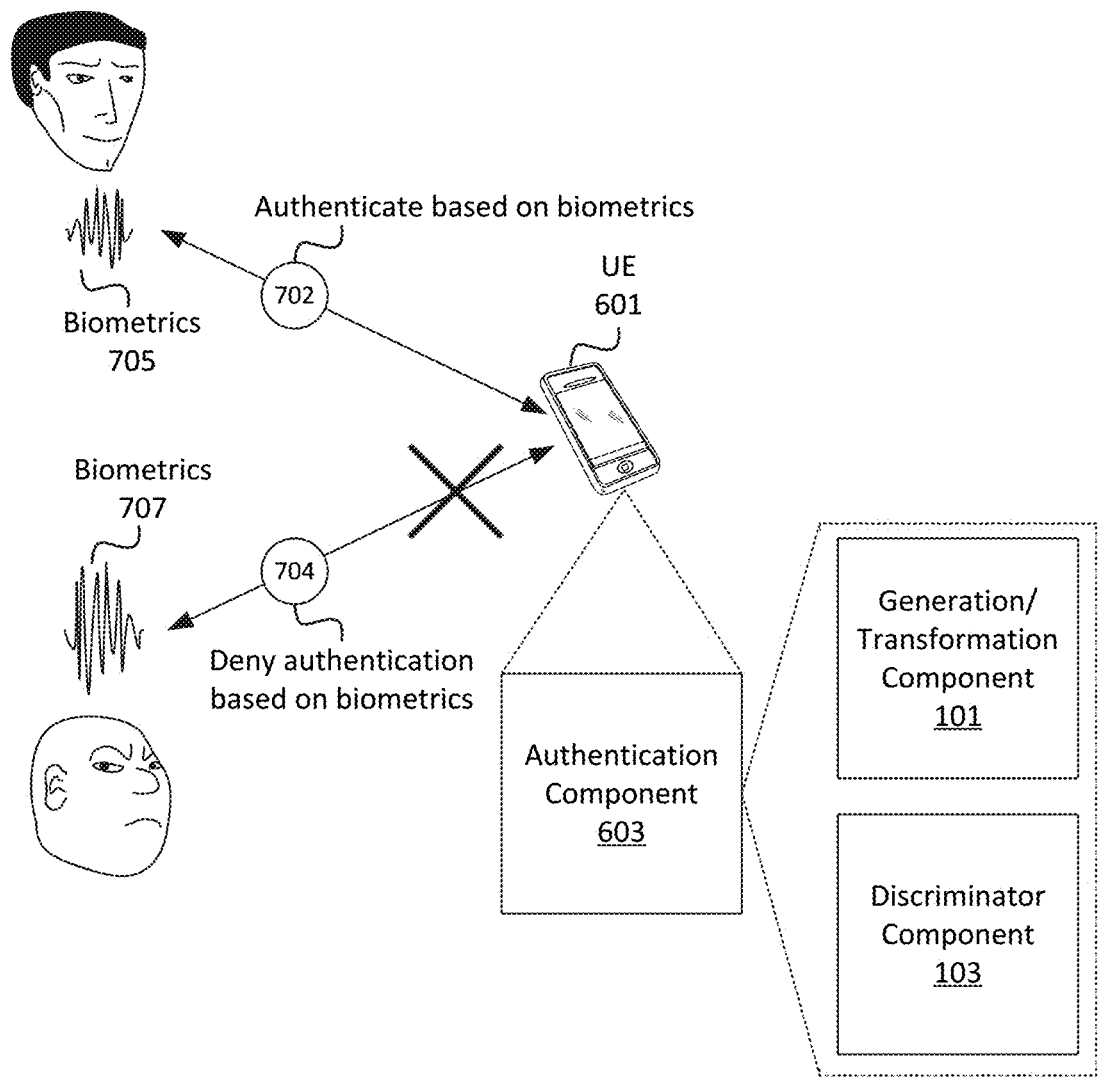

As discussed above, similar concepts may apply to different types of biometrics. For example, as shown in FIG. 7, UE 601 may authenticate (at 702) a first user based on biometrics 705, and may deny (at 704) authentication of a second user based on biometrics 707. In this example, biometrics 705 and 707 may include voice-based biometrics, and may be captured via a microphone or other suitable component associated with UE 601 and/or authentication component 603. GTC 101 and/or DC 103 may have been previously configured to determine whether a test voice sample matches a reference voice sample of the first user. For example, authentication component 603, in concert with GTC 101 and/or DC 103, may determine whether voice biometrics 705 and/or 707 match voice biometrics of the first user. In making this determination, authentication component 603 (e.g., GTC 101 and/or DC 103) may perform any type of suitable analysis, such as determining whether a sound signature of biometrics 705 and/or biometrics 707 match a reference sound signature, whether a word or phrase associated with biometrics 705 and/or biometrics 707 match a reference word or phrase, and/or some other type of sound-based analysis.

Figure 8:
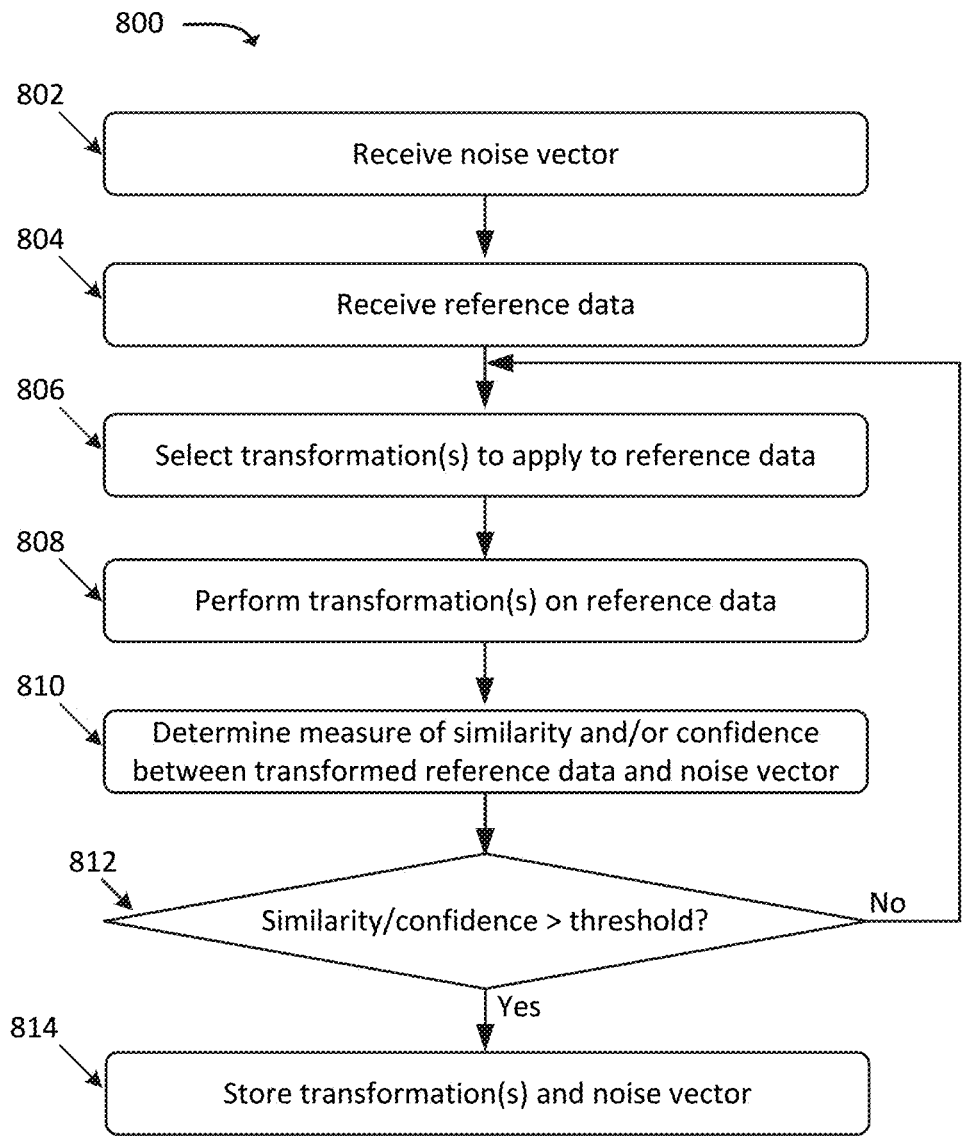
FIG. 8 illustrates an example process for configuring a GTC and/or a DC, in accordance with some embodiments, to store transformations and a noise vector.

FIG. 8 illustrates an example process 800 for configuring GTC 101 and/or DC 103, in accordance with some embodiments, to store transformations and a noise vector to be used for further operations (e.g., determining whether test data matches the reference data, as discussed further below with respect to FIG. 9). In some embodiments, some or all of process 800 may be performed by UE 601. In some embodiments, one or more other devices may perform some or all of process 800 in concert with, and/or in lieu of, UE 601. For example, some or all of process 800 may be performed by one or more devices that include or implement GTC 101 and/or DC 103, in instances where UE 601 does not include or implement GTC 101 and DC 103.

As shown, process 800 may include receiving (at 802) a noise vector. For example, as discussed above, DC 103 may receive a noise vector from a component that generates random, pseudorandom, or other types of unique data, and/or may generate such data. The noise vector may be, or may include, an image file, an audio file, a set of weights, and/or other suitable data that can be used as "noise" in accordance with concepts described herein. In some embodiments, the noise vector may be different in different instances of process 800. In this manner, each instance of process 800 may yield different noise vectors, which may be difficult or impossible to reproduce or reverse engineer.

Process 800 may further include receiving (at 804) reference data. For example, as discussed above, GTC 101 may receive reference data, which may include image data, audio data, and/or some other type of data. Generally speaking, the reference data may be related to, or may include, biometric data of a user who is performing an authentication setup or initialization procedure. In some embodiments, GTC 101 may analyze the reference data to determine a type of the data (e.g., whether the data is image data, audio data, etc.). In other embodiments, GTC 101 may perform subsequent operations without determining the type of data.

Process 800 may additionally include selecting (at 806) one or more transformations to apply to the reference data. For example, GTC 101 may determine, generate, select, etc. a particular transformation (or set of transformations) to apply to the reference data. The transformations may include a modification, manipulation, etc. of the reference data. In some embodiments, when GTC 101 has identified the type of data to which the reference data corresponds, GTC 101 may perform transformations based on the type of data. For example, if GTC 101 determines that the reference data includes image data, GTC 101 may select one or more image-based transformations (e.g., modifying colors, shapes, and/or other image-based features) of the reference data. As another example, if GTC 101 determines that the reference data includes audio data, GTC 101 may select one or more audio-based transformations (e.g., modifying pitch, volume, and/or other audio-based features). Additionally, or alternatively, GTC 101 may select type-agnostic transformations, such as modifying bits, bytes, or other low-level information in one or more files that represent or include the reference data.

Process 800 may also include performing (at 808) the selected transformation(s) on the reference data. For example, GTC 101 may modify, transform, etc. the reference data based on the one or more selected transformations.

Process 800 may further include determining (at 810) a measure of similarity and/or confidence between the transformed reference data and the noise vector. For example, DC 103 may generate one or more scores and/or other measures of similarity, difference, confidence, etc., as described above.

Process 800 may additionally include determining (at 812) whether the measure of similarity and/or confidence exceeds a threshold measure of similarity and/or confidence. If the measure of similarity and/or confidence (determined at 810) exceeds the threshold measure (at 812-YES), then GTC 101 may store (at 814) the set of transformations (performed at 808) and DC 103 may store (at 814) the noise vector. As discussed below, these transformations and the noise vector may be used to verify whether subsequently received test data matches the reference data.

If, on the other hand, the measure of similarity and/or confidence does not exceed the threshold measure (at 812-NO), then process 800 may return to block 806 for further iterations. For example, GTC 101 may select (at 806) a different set of transformations, based on the received measure of similarity and/or confidence. For example, GTC 101 may utilize machine learning techniques in order to iteratively refine the selected set of transformations, in order to select transformations that cause the measure of similarity and/or confidence to increase, until a set of transformations is determined that cause the measure of similarity and/or confidence to exceed the threshold (e.g., at 812-YES).

Figure 9:
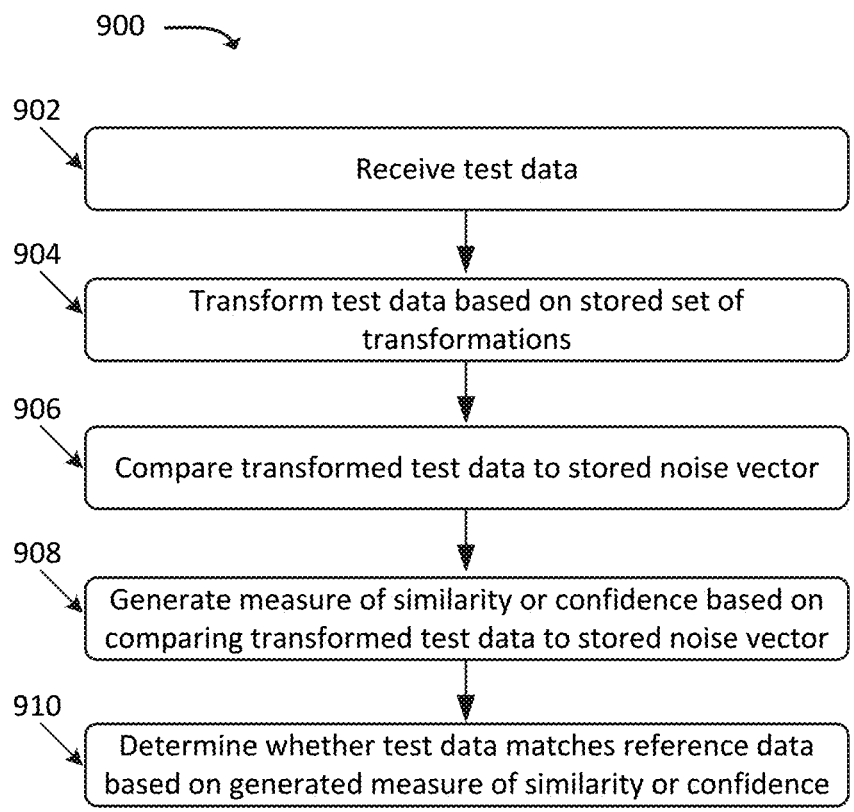
FIG. 9 illustrates an example process for determining whether test data matches previously evaluated reference data, in accordance with some embodiments.

FIG. 9 illustrates an example process 900 for determining whether test data matches previously evaluated reference data. For example, process 900 may be a "deployment phase" process, while process 800 may be a "learning phase" or "initialization phase" process. In some embodiments, some or all of process 900 may be performed by UE 601. In some embodiments, one or more other devices may perform some or all of process 900 in concert with, and/or in lieu of, UE 601. For example, some or all of process 900 may be performed by one or more devices that include or implement GTC 101 and/or DC 103, in instances where UE 601 does not include or implement GTC 101 and DC 103.

As shown, process 900 may include receiving (at 902) test data. For example, GTC 101 may receive image data, audio data, and/or some other type of test data. As discussed above, the test data may include biometric data captured by authentication component 603, such as an image of a user's face, a user's fingerprint, audio data of a user's voice, etc.

Process 900 may further include transforming (at 904) the test data based on a stored set of transformations. For example, GTC 101 may perform a previously stored set of transformations on the test data. As discussed above, the previously stored set of transformations may have been determined based on an iterative machine learning process, in which reference data was transformed to match a noise vector.

Process 900 may additionally include comparing (at 906) the transformed test data to the stored noise vector. For example, DC 103 may perform any suitable analysis, and may generate (at 908) a measure of similarity and/or confidence based on comparing the transformed test data to the stored noise vector. Process 900 may further include determining (at 910) whether the test data matches the reference data based on the generated measure of similarity and/or confidence. For example, if the measure of similarity and/or confidence exceeds a threshold level of similarity and/or confidence, then GTC 101 and/or DC 103 may determine that the test data matches the reference data.

In accordance with processes 800 and/or 900 described above, GTC 101 and DC 103 (e.g., UE 601, which may implement and/or otherwise communicate with GTC 101 and/or DC 103) may not need to store the reference data itself in order to verify whether test data matches the reference data. Thus, in instances where these processes are used for biometric-based user authentication, the actual biometrics of the user (e.g., user images, fingerprints, voice samples, or the like) may not need to be stored by UE 601 or an associated system. Further, because noise vectors may vary from UE to UE, it may be impractical or impossible to reverse engineer an algorithm by which user biometrics can be determined based on noise vectors.

Figure 10:
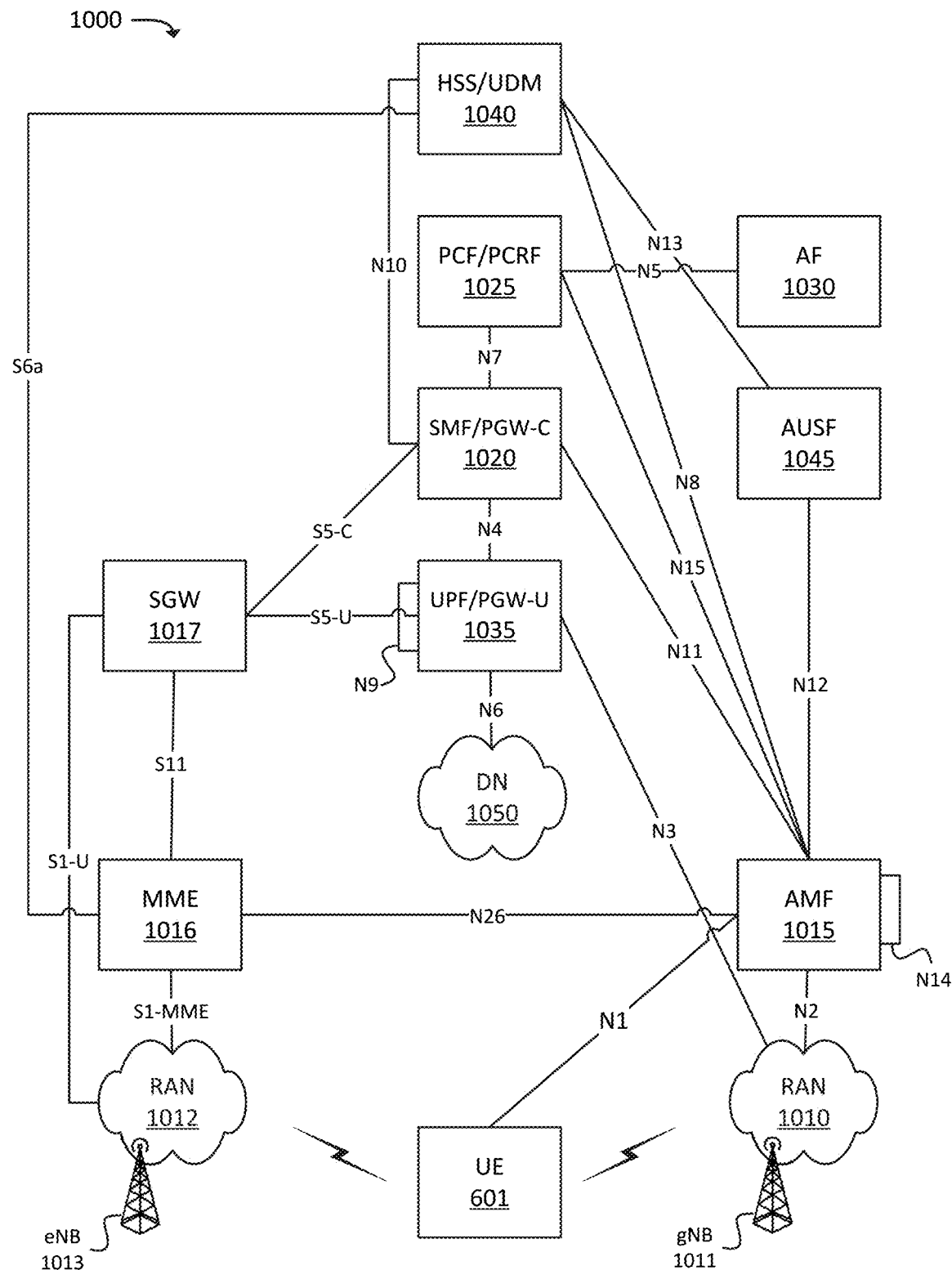
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1000 may include UE 601, RAN 1010 (which may include one or more Next Generation Node Bs ("gNBs") 1011), RAN 1012 (which may include one or more one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Home Subscriber Server ("HSS")/Unified Data Management ("UDM") 1040, Authentication Server Function ("AUSF") 1045. Environment 1000 may also include one or more networks, such as Data Network ("DN") 1050.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 601 may include a computation and communication device, such as a wireless mobile communication device that is capable of communicating with RAN 1010 and/or DN 1050. UE 601 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, a Mobile-to-Mobile ("M2M") device, an Internet of Things ("IoT") device, a Mobile-to-Mobile ("M2M") device, or another type of mobile computation and communication device. UE 601 may send traffic to and/or receive traffic (e.g., user plane traffic) from DN 1050 via RAN 1010 and UPF/PGW-U 1035.

In some embodiments, UE 601 may include, and/or may be communicatively coupled to, GTC 101 and/or DC 103. For example, GTC 101 and DC 103 may be components of UE 601 in some embodiments. In some embodiments, GTC 101, DC 103, or both, may execute remotely from UE 601 (e.g., via an application server or other type of device or system). In such embodiments, UE 601 may communicate with GTC 101 and/or DC 103 via RAN 1010, RAN 1012, DN 1050, and/or some other type of network.

RAN 1010 may be, or may include, a 5G RAN that includes one or more base stations (e.g., one or more gNBs 1011), via which UE 601 may communicate with one or more other elements of environment 1000. UE 601 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 601 via the air interface, and may communicate the traffic to UPF/PGW-U 1035, and/or one or more other devices or networks. Similarly, RAN 1010 may receive traffic intended for UE 601 (e.g., from UPF/PGW-U 1035, AMF 1015, and/or one or more other devices or networks) and may communicate the traffic to UE 601 via the air interface.

RAN 1012 may be, or may include, an LTE RAN that includes one or more base stations (e.g., one or more eNBs 1013), via which UE 601 may communicate with one or more other elements of environment 1000. UE 601 may communicate with RAN 1012 via an air interface (e.g., as provided by eNB 1013). For instance, RAN 1010 may receive traffic (e.g., voice call traffic, data traffic, messaging traffic, signaling traffic, etc.) from UE 601 via the air interface, and may communicate the traffic to UPF/PGW-U 1035, and/or one or more other devices or networks. Similarly, RAN 1010 may receive traffic intended for UE 601 (e.g., from UPF/PGW-U 1035, SGW 1017, and/or one or more other devices or networks) and may communicate the traffic to UE 601 via the air interface.

AMF 1015 may include one or more devices, systems, Virtualized Network Functions ("VNFs"), etc., that perform operations to register UE 601 with the 5G network, to establish bearer channels associated with a session with UE 601, to hand off UE 601 from the 5G network to another network, to hand off UE 601 from the other network to the 5G network, manage mobility of UE 601 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, etc., that perform operations to register UE 601 with the EPC, to establish bearer channels associated with a session with UE 601, to hand off UE 601 from the EPC to another network, to hand off UE 601 from another network to the EPC, manage mobility of UE 601 between RANs 1012 and/or eNBs 1013, and/or to perform other operations.

SGW 1017 may include one or more devices, systems, VNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, etc., that gather, process, store, and/or provide information in a manner described herein. SMF/PGW-C 1020 may, for example, facilitate in the establishment of communication sessions on behalf of UE 601. In some embodiments, the establishment of communications sessions may be performed in accordance with one or more policies provided by PCF/PCRF 1025.

PCF/PCRF 1025 may include one or more devices, systems, VNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, etc., that receive, store, and/or provide information that may be used in determining parameters (e.g., quality of service parameters, charging parameters, or the like) for certain applications.

UPF/PGW-U 1035 may include one or more devices, systems, VNFs, etc., that receive, store, and/or provide data (e.g., user plane data). For example, UPF/PGW-U 1035 may receive user plane data (e.g., voice call traffic, data traffic, etc.), destined for UE 601, from DN 1050, and may forward the user plane data toward UE 601 (e.g., via RAN 1010, SMF/PGW-C 1020, and/or one or more other devices). In some embodiments, multiple UPFs 1035 may be deployed (e.g., in different geographical locations), and the delivery of content to UE 601 may be coordinated via the N9 interface (e.g., as denoted in FIG. 10 by the line marked "N9" originating and terminating at UPF/PGW-U 1035). Similarly, UPF/PGW-U 1035 may receive traffic from UE 601 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

HSS/UDM 1040 and AUSF 1045 may include one or more devices, systems, VNFs, etc., that manage, update, and/or store, in one or more memory devices associated with AUSF 1045 and/or HSS/UDM 1040, profile information associated with a subscriber. AUSF 1045 and/or HSS/UDM 1040 may perform authentication, authorization, and/or accounting operations associated with the subscriber and/or a communication session with UE 601.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 601 may communicate, through DN 1050, with data servers, other UEs 601, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 601 may communicate.

Figure 11:
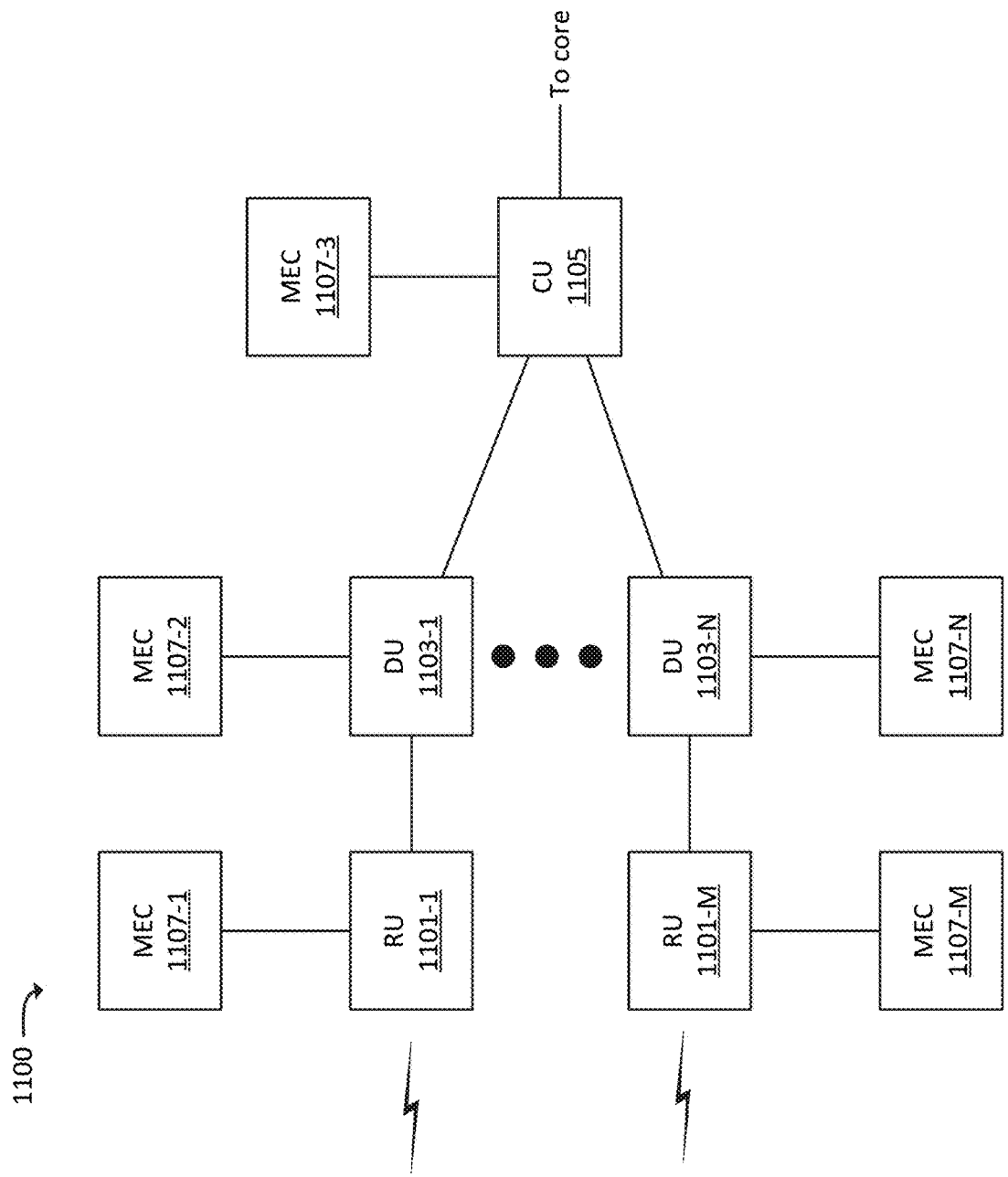
FIG. 11 illustrates an example arrangement of a radio access network ("RAN"), in accordance with some embodiments.

FIG. 11 illustrates an example Distributed Unit ("DU") network 1100, which may be included in and/or implemented by one or more RANs (e.g., RAN 1010). In some embodiments, a particular RAN may include one DU network 1100. In some embodiments, a particular RAN may include multiple DU networks 1100. In some embodiments, DU network 1100 may correspond to a particular gNB 1011 of a 5G RAN (e.g., RAN 1010). In some embodiments, DU network 1100 may correspond to multiple gNBs 1011. In some embodiments, DU network 1100 may correspond to one or more other types of base stations of one or more other types of RANs. As shown, DU network 1100 may include Central Unit ("CU") 1105, one or more Distributed Units ("DUs") 1103-1 through 1103-N (referred to individually as "DU 1103," or collectively as "DUs 1103"), and one or more Remote Units ("RUs") 1101-1 through 1101-M (referred to individually as "RU 1101," or collectively as "RUs 1101").

CU 1105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 601 to a core network), CU 1105 may aggregate traffic from DUs 1103, and forward the aggregated traffic to the core network. In some embodiments, CU 1105 may receive traffic according to a given protocol (e.g., Radio Link Control ("RLC")) from DUs 1103, and may perform higher-layer processing (e.g., may aggregate/process RLC packets and generate Packet Data Convergence Protocol ("PDCP") packets based on the RLC packets) on the traffic received from DUs 1103.

In accordance with some embodiments, CU 1105 may receive downlink traffic (e.g., traffic from the core network) for a particular UE 601, and may determine which DU(s) 1103 should receive the downlink traffic. DU 1103 may include one or more devices that transmit traffic between a core network (e.g., via CU 1105) and UE 601 (e.g., via a respective RU 1101). DU 1103 may, for example, receive traffic from RU 1101 at a first layer (e.g., physical ("PHY") layer traffic, or lower PHY layer traffic), and may process/aggregate the traffic to a second layer (e.g., upper PHY and/or RLC). DU 1103 may receive traffic from CU 1105 at the second layer, may process the traffic to the first layer, and provide the processed traffic to a respective RU 1101 for transmission to UE 601.

RU 1101 may include hardware circuitry (e.g., one or more RF transceivers, antennas, radios, and/or other suitable hardware) to communicate wirelessly (e.g., via an RF interface) with one or more UEs 601, one or more other DUs 1103 (e.g., via RUs 1101 associated with DUs 1103), and/or any other suitable type of device. In the uplink direction, RU 1101 may receive traffic from UE 601 and/or another DU 1103 via the RF interface and may provide the traffic to DU 1103. In the downlink direction, RU 1101 may receive traffic from DU 1103, and may provide the traffic to UE 601 and/or another DU 1103.

RUs 1101, DUs 1103, and/or CUs 1105 may, in some embodiments, be communicatively coupled to one or more Multi-Access/Mobile Edge Computing ("MEC") devices, referred to sometimes herein simply as ("MECs") 1107. For example, RU 1101-1 may be communicatively coupled to MEC 1107-1, RU 1101-M may be communicatively coupled to MEC 1107-M, DU 1103-1 may be communicatively coupled to MEC 1107-2, DU 1103-N may be communicatively coupled to MEC 1107-N, CU 1105 may be communicatively coupled to MEC 1107-3, and so on. MECs 1107 may include hardware resources (e.g., configurable or provisionable hardware resources) that may be configured to provide services and/or otherwise process traffic to and/or from UE 601, via a respective RU 1101.

For example, RU 1101-1 may route some traffic, from UE 601, to MEC 1107-1 instead of to a core network (e.g., via a particular DU 1103 and/or CU 1105). MEC 1107-1 may process the traffic, perform one or more computations based on the received traffic, and may provide traffic to UE 601 via RU 1101-1. In this manner, ultra-low latency services may be provided to UE 601, as traffic does not need to traverse DU 1103, CU 1105, and an intervening backhaul network between DU network 1100 and the core network. In some embodiments, MEC 1107 may include, and/or may implement, GTC 101 and/or DC 103.

Figure 12:
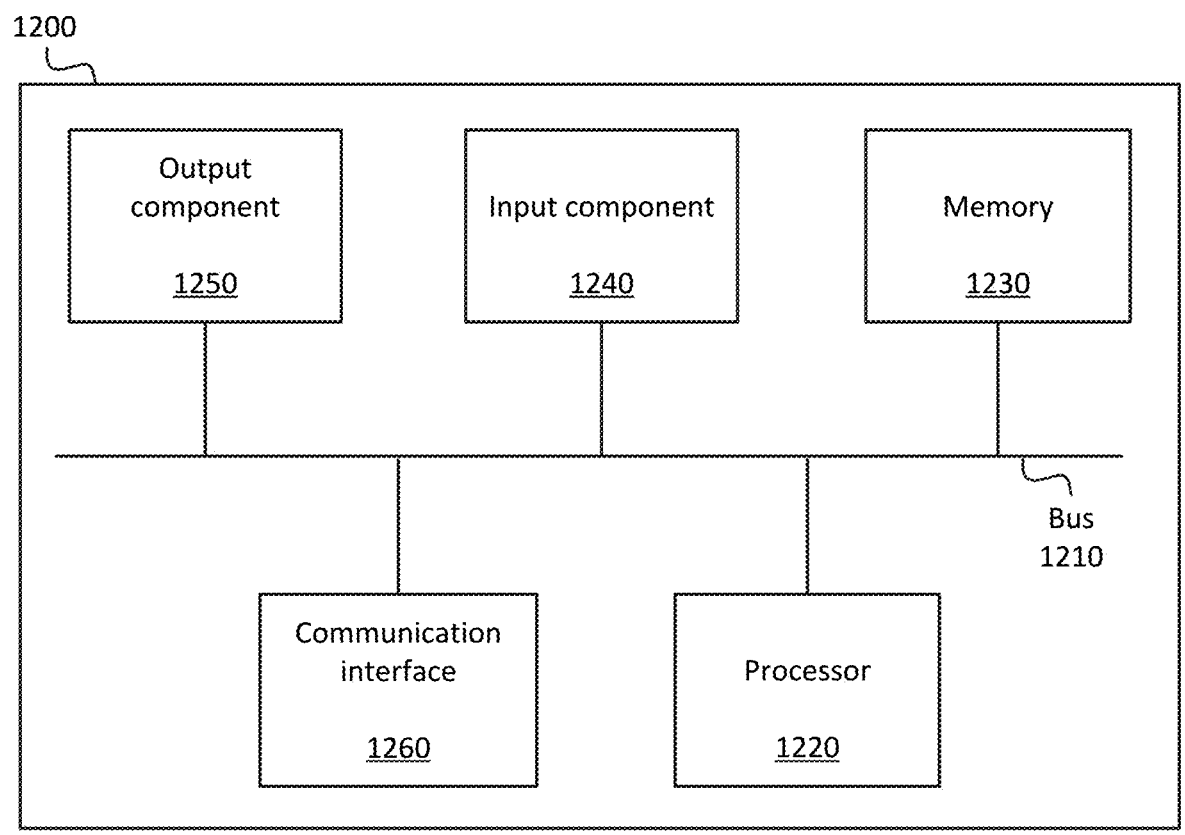
FIG. 12 illustrates example functional components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200, such as a keyboard, a keypad, a button, a switch, etc. Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth© radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
apply a particular set of transformations to a first set of biometric data;
determine that a first measure of similarity between a second set of data and the first set of biometric data, with the particular set of transformations applied, exceeds a first threshold measure of similarity, wherein the second set of data includes a noise vector;
maintain, in a storage associated with the device and based on determining that the first measure of similarity exceeds the first threshold measure of similarity, the particular set of transformations and the second set of data, without maintaining the first set of biometric data in the storage associated with the device;
apply, based on determining that the first measure of similarity exceeds the first threshold measure of similarity, the particular set of transformations to a third set of data;
determine a second measure of similarity, between the second set of data and the third set of data with the particular set of transformations applied; and
determine, based on whether the second measure of similarity exceeds a second threshold measure of similarity, whether the third set of data matches the first set of biometric data without comparing the third set of data to the first set of biometric data.

2. The device of claim 1, wherein the third set of data includes data received as part of an authentication request, wherein the one or more processors are further configured to:
   accept the authentication request when determining that the first set of biometric data matches the third set of data, and
   deny the authentication request when determining that the first set of biometric data does not match the third set of data.

3. The device of claim 2, wherein the third set of data includes biometric information received as part of the authentication request.

4. The device of claim 2, wherein the first set of biometric data is received as part of a registration of an authentication mechanism with which the authentication request is associated.

5. The device of claim 1, wherein the first set of biometric data includes at least one of:
   image data,
   fingerprint data, or
   audio data.

6. The device of claim 1, wherein the particular set of transformations is a first set of transformations, wherein the one or more processors are further configured to:
   apply a second set of transformations to the first set of biometric data;
   determine that a third measure of similarity between the second set of data and the first set of biometric data, with the second set of transformations applied, does not exceed the threshold measure of similarity; and
   select the first set of transformations to apply to the first set of biometric data based on determining that the third measure of similarity, between the second set of data and the first set of biometric data with the second set of transformations applied, does not exceed the threshold measure of similarity,
      wherein applying the first set of transformations is performed after determining that the third measure of similarity, between the second set of data and the first set of biometric data with the second set of transformations applied, does not exceed the threshold measure of similarity.

7. A method, comprising:
   applying a particular set of transformations to a first set of data;
   determining that a first measure of similarity between a second set of data and the first set of biometric data, with the particular set of transformations applied, exceeds a first threshold measure of similarity, wherein the second set of data includes a noise vector;
   maintaining, in a storage associated with the device and based on determining that the first measure of similarity exceeds the first threshold measure of similarity, the particular set of transformations and the second set of data, without maintaining the first set of biometric data in the storage associated with the device;
   applying, based on determining that the first measure of similarity exceeds the first threshold measure of similarity, the particular set of transformations to a third set of data;
   determining a second measure of similarity, between the second set of data and the third set of data with the particular set of transformations applied; and
   determining, based on whether the second measure of similarity exceeds a second threshold measure of similarity, whether the third set of data matches the first set of biometric data without comparing the third set of data to the first set of biometric data.

8. A non-transitory computer-readable medium, storing a plurality of processor-executable instructions to:
   apply a particular set of transformations to a first set of data;
   determine that a first measure of similarity between a second set of data and the first set of biometric data, with the particular set of transformations applied, exceeds a first threshold measure of similarity, wherein the second set of data includes a noise vector;
   maintain, in a storage associated with the device and based on determining that the first measure of similarity exceeds the first threshold measure of similarity, the particular set of transformations and the second set of data, without maintaining the first set of biometric data in the storage associated with the device;
   apply, based on determining that the first measure of similarity exceeds the first threshold measure of similarity, the particular set of transformations to a third set of data;
   determine a second measure of similarity, between the second set of data and the third set of data with the particular set of transformations applied; and
   determine, based on whether the second measure of similarity exceeds a second threshold measure of similarity, whether the third set of data matches the first set of biometric data without comparing the third set of data to the first set of biometric data.

9. The non-transitory computer-readable medium of claim 8, wherein the third set of data includes data received as part of an authentication request, wherein the plurality of processor-executable instructions further include processor-executable instructions to:
   accept the authentication request when determining that the first set of biometric data matches the third set of data, and
   deny the authentication request when determining that the first set of biometric data does not match the third set of data.

10. The non-transitory computer-readable medium of claim 9, wherein the third set of data includes biometric information received as part of the authentication request.

11. The non-transitory computer-readable medium of claim 9, wherein the first set of biometric data is received as part of a registration of an authentication mechanism with which the authentication request is associated.

12. The non-transitory computer-readable medium of claim 8, wherein the first set of biometric data includes at least one of:
   image data,
   fingerprint data, or
   audio data.

13. The non-transitory computer-readable medium of claim 8, wherein the particular set of transformations is a first set of transformations, wherein the plurality of processor-executable instructions further include processor-executable instructions to:
   apply a second set of transformations to the first set of biometric data;
   determine that a third measure of similarity between the second set of data and the first set of biometric data, with the second set of transformations applied, does not exceed the threshold measure of similarity; and select the first set of transformations to apply to the first set of biometric data based on determining that the third measure of similarity, between the second set of data and the first set of biometric data with the second set of transformations applied, does not exceed the threshold measure of similarity,
  wherein applying the first set of transformations is performed after determining that the third measure of similarity, between the second set of data and the first set of biometric data with the second set of transformations applied, does not exceed the threshold measure of similarity.

14. The device of claim 1, wherein the first set of data includes at least one of:
  image data,
  fingerprint data, or
  voice data.

15. The method of claim 7, wherein the first set of data includes at least one of:
  image data,
  fingerprint data, or
  voice data.

16. The method of claim 7, wherein the third set of data includes data received as part of an authentication request, the method further comprising:
  accepting the authentication request when determining that the first set of biometric data matches the third set of data, and
  denying the authentication request when determining that the first set of biometric data does not match the third set of data.

17. The method of claim 16, wherein the third set of data includes biometric information received as part of the authentication request.

18. The method of claim 16, wherein the first set of biometric data is received as part of a registration of an authentication mechanism with which the authentication request is associated.

19. The method of claim 7, wherein the particular set of transformations is a first set of transformations, the method further comprising:
  applying a second set of transformations to the first set of biometric data;
  determining that a third measure of similarity between the second set of data and the first set of biometric data, with the second set of transformations applied, does not exceed the threshold measure of similarity; and
  selecting the first set of transformations to apply to the first set of biometric data based on determining that the third measure of similarity, between the second set of data and the first set of biometric data with the second set of transformations applied, does not exceed the threshold measure of similarity,
    wherein applying the first set of transformations is performed after determining that the third measure of similarity, between the second set of data and the first set of biometric data with the second set of transformations applied, does not exceed the threshold measure of similarity.

20. The non-transitory computer-readable medium of claim 8, wherein the first set of data includes at least one of:
  image data,
  fingerprint data, or
  voice data.

* * * * *